US009314692B2

(12) United States Patent
Konoplev et al.

(10) Patent No.: US 9,314,692 B2
(45) Date of Patent: Apr. 19, 2016

(54) METHOD OF CREATING AVATAR FROM USER SUBMITTED IMAGE

(71) Applicant: Luxand, Inc., Alexandria, VA (US)

(72) Inventors: Aleksey Konoplev, St. Petersburg (RU); Yury Volkov, St. Petersburg (RU); Aleksey Orlov, St. Petersburg (RU)

( * ) Notice: Subject to any disclaimer, the term of this patent is extended or adjusted under 35 U.S.C. 154(b) by 212 days.

(21) Appl. No.: 13/624,596

(22) Filed: Sep. 21, 2012

(65) Prior Publication Data

US 2014/0085293 A1  Mar. 27, 2014

(51) Int. Cl.
| | |
|---|---|
| G06T 13/40 | (2011.01) |
| A63F 13/30 | (2014.01) |
| A63F 13/40 | (2014.01) |
| G06K 9/00 | (2006.01) |

(52) U.S. Cl.
CPC ............ *A63F 13/12* (2013.01); *A63F 13/10* (2013.01); *G06K 9/00315* (2013.01); *A63F 2300/5553* (2013.01); *A63F 2300/6607* (2013.01); *A63F 2300/695* (2013.01)

(58) Field of Classification Search
CPC ... G06T 13/40; G06T 2200/04; G06T 19/003; G06T 13/80; G06T 2213/08; G06T 7/60; G06T 17/00; G06T 2207/30201; G06T 11/001; G06T 17/20; G06T 15/00; G06T 15/04; G06T 19/00; G06T 2219/2021; G06T 15/50; G06T 2207/20124
See application file for complete search history.

(56) References Cited

U.S. PATENT DOCUMENTS

| | | | | |
|---|---|---|---|---|
| 8,391,642 | B1 * | 3/2013 | Petruszka et al. | 382/285 |
| 2004/0208344 | A1 * | 10/2004 | Liu et al. | 382/118 |
| 2004/0239678 | A1 * | 12/2004 | Tsunashima et al. | 345/552 |
| 2006/0282387 | A1 * | 12/2006 | Ahmad et al. | 705/50 |
| 2008/0063263 | A1 * | 3/2008 | Zhang et al. | 382/159 |
| 2008/0201442 | A1 * | 8/2008 | Ostermann et al. | 709/206 |
| 2009/0153552 | A1 * | 6/2009 | Fidaleo et al. | 345/419 |
| 2010/0014721 | A1 * | 1/2010 | Steinberg et al. | 382/118 |
| 2010/0030578 | A1 * | 2/2010 | Siddique et al. | 705/3 |
| 2010/0202682 | A1 * | 8/2010 | Lieckfeldt | 382/162 |
| 2011/0007174 | A1 * | 1/2011 | Bacivarov et al. | 348/222.1 |
| 2013/0120433 | A1 * | 5/2013 | DiVerdi et al. | 345/593 |

OTHER PUBLICATIONS

Terzopoulos, Demetri, and Keith Waters. "Physically-based facial modelling, analysis, and animation." The journal of visualization and computer animation 1.2 (1990): 73-80.*
Choi, Chang Seok, et al. "Analysis and synthesis of facial image sequences in model-based image coding." Circuits and Systems for Video Technology, IEEE Transactions on 4.3 (1994): 257-275.*
Essa, Irfan, and Alex P. Pentland. "Coding, analysis, interpretation, and recognition of facial expressions." Pattern Analysis and Machine Intelligence, IEEE Transactions on 19.7 (1997): 757-763.*

(Continued)

*Primary Examiner* — Ulka Chauhan
*Assistant Examiner* — Sultana M Zalalee
(74) *Attorney, Agent, or Firm* — Superior IP, PLLC; Dustin L. Call

(57) ABSTRACT

One example embodiment includes a method for creating an avatar from an image. The method includes receiving an image including a face from a user. The method also includes constructing a 3D model of the face from the image. The method further includes animating the 3D model. The method additionally includes attaching the 3D model to an animated character.

17 Claims, 11 Drawing Sheets

(56) References Cited

OTHER PUBLICATIONS

Noh, Jun-yong, and Ulrich Neumann. A survey of facial modeling and animation techniques. USC Technical Report, 99-705, 1998.*

Valente, Stéphane, and Jean-Luc Dugelay. "Face tracking and realistic animations for telecommunicant clones." Multimedia Computing and Systems, 1999. IEEE International Conference on. vol. 2. IEEE, 1999.*

Viola, Paul, Robust Real-time Object Detection, Second International Workshop on Statistical and Computing Theories of Vision, Jul. 13, 2011, Vancouver, Canada.

Waters, Keith, A Muscle Model for Animating Three-Dimensional Facial Expression, Computer Graphics, Jul. 1987, vol. 21, No. 4.

* cited by examiner

METHOD OF CREATING AVATAR FROM USER SUBMITTED IMAGE

CROSS-REFERENCE TO RELATED APPLICATIONS

Not applicable.

BACKGROUND OF THE INVENTION

Despite enormous technological advancement, producing an animation or caricature based on a person's face is still work that is mostly done by an artist. That is, there is not a process that is capable of automating such a process that results in realistic or desired results. This means that for the vast majority of users such an animation or caricature is not reasonably obtained.

In addition, hand drawn caricatures have a number of drawbacks. For example, the resulting drawings do not exist in a digital form. In order for a digital copy to be created, the hand drawing must be scanned or otherwise digitized. This means more work in addition to obtaining the caricature.

Further, the caricatures are 2D images. That is, the caricature is a drawing and incapable of being animated or otherwise manipulated in a 3D manner. If the customer prefers a 3D animation, then a much more required and involved process is required. Or, a facial image is simply pasted onto an animated character, resulting in an animation that is not realistic. Neither option may be attractive to a particular user.

Accordingly, there is a need in the art for automatic creation of an avatar from a user supplied image. Moreover, there is a need in the art for a process which can animate the avatar.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a method for creating an avatar from an image. The method includes receiving an image including a face from a user. The method also includes constructing a 3D model of the face from the image. The method further includes animating the 3D model. The method additionally includes attaching the 3D model to an animated character.

Another example embodiment includes a method for creating an avatar from an image. The method includes receiving an image including a face from a user. The method also includes identifying the coordinates of one or more facial features within the face. The method further includes constructing a 3D model of the face from the image. Constructing a 3D model of the face from the image includes choosing a predefined 3D model. Constructing a 3D model of the face from the image also includes deforming the predefined 3D model to match the shape and location of the identified coordinates of the one or more facial features. Constructing a 3D model of the face from the image further includes projecting the facial image over a predefined 3D model. The method additionally includes animating the 3D model. The method moreover includes attaching the 3D model to an animated character.

Another example embodiment includes, in a computing system, a non-transitory computer-readable storage medium including instructions that, when executed by a computing device, cause the computing device to create an avatar from an image by performing steps. The steps include receiving an image including a face from a user. The steps also include identifying the coordinates of one or more facial features within the face. The steps further include constructing a 3D model of the face from the image. Constructing a 3D model of the face from the image includes choosing a predefined 3D model. Constructing a 3D model of the face from the image also includes deforming the predefined 3D model to match the shape and location of the identified coordinates of the one or more facial features. Constructing a 3D model of the face from the image further includes projecting the facial image over a predefined 3D model. The steps additionally include rendering the 3D model at a predefined 3D angle. The steps moreover include animating the 3D model. The steps also include attaching the 3D model to an animated character.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

I. Creation of a 3D Avatar

Figure 1:
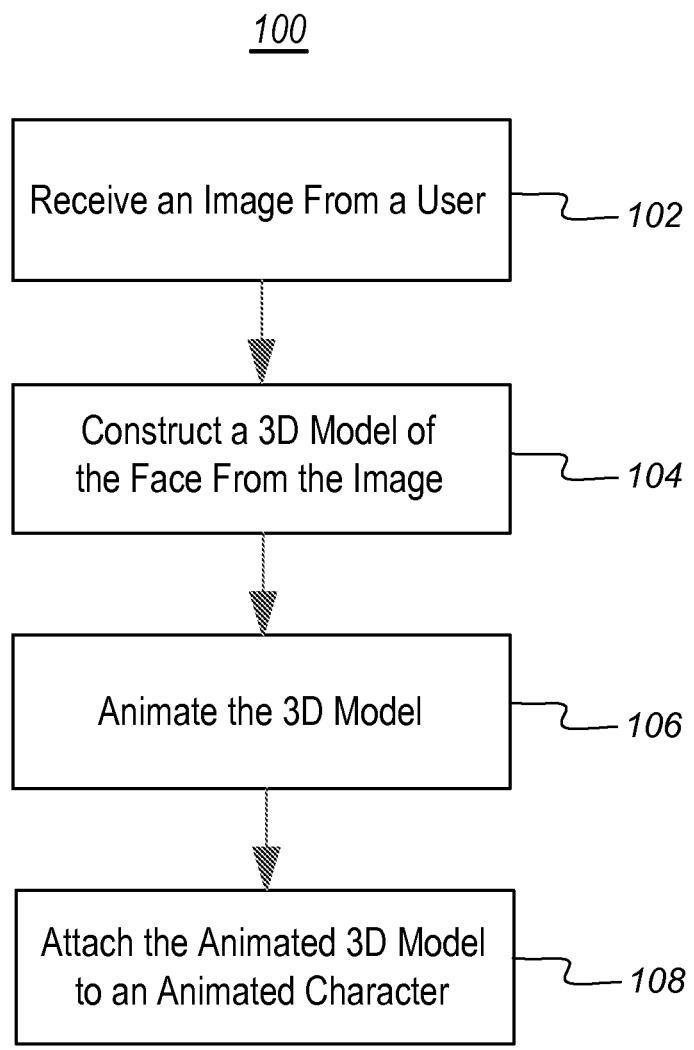
FIG. 1 is a flowchart illustrating an example of a method for creating a 3D avatar.

FIG. 1 is a flowchart illustrating an example of a method 100 for creating a 3D avatar. The method 100 can automatically transform a single digital image into an animated 3D avatar. In particular, the user can upload a digital image or other image and receive one or more avatars featuring different facial expressions and/or animations in return. The avatar is displayed to the user to be used as any still or animated image (for example, in GIF format). For example, the avatar can be sent to other users via SMS, MMS, e-mail messages, chats (like Facebook chat), instant messengers (like Skype or Windows Messenger), Twitter, blogs, forums or other means of electronic communication in purpose of displaying the user's emotion.

Figure 2:
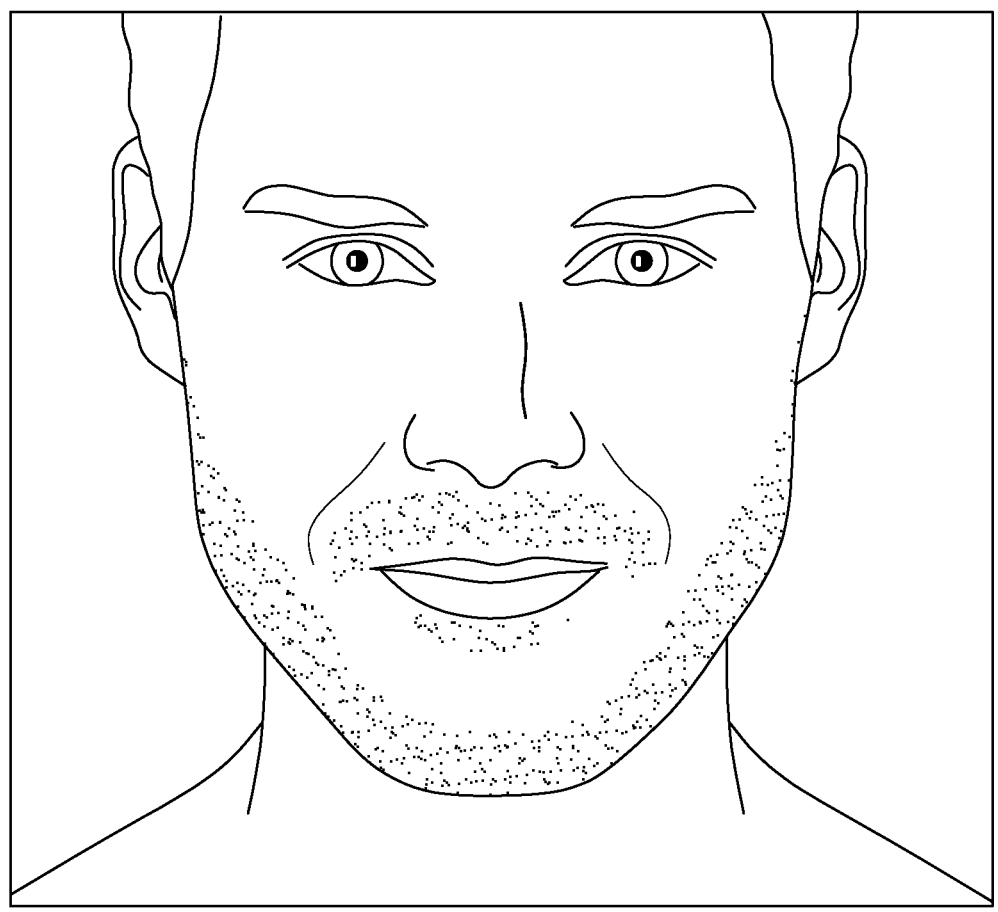
FIG. 2 is an illustration of an image that includes a face.

FIG. 1 shows that the method 100 can include receiving 102 an image from the user. The image can include a face either from a frontal view or from some offset angle, as described below, one example embodiment of which is shown in FIG. 2. The image can be received using any desired method. For example, the image can be uploaded using a webpage, application, mobile phone app, file sharing network or any other desired upload method. Additionally or alternatively, the image can be saved to a particular location or otherwise be provided by the user.

FIG. 1 also shows that the method 100 can include constructing 104 a 3D model of a face from the image. The 3D model can be constructed 104 by matching the face from the image to a template that most closely matches the face, as described below. I.e., a standard model can be modified to show the face from the image.

FIG. 1 further shows that the method 100 can include animating 106 the 3D model. The 3D model can be animated 106 by means of translation, rotation, scaling, deformation or any other animation method, as discussed below. For example, the model can undergo various deformations to take different facial expressions. Additionally or alternatively, a system of "facial muscles" can be employed to simulate realistic facial expressions. I.e., facial muscles can be simulated, which can, in turn, be used to animate 106 the 3D model.

Figure 3:
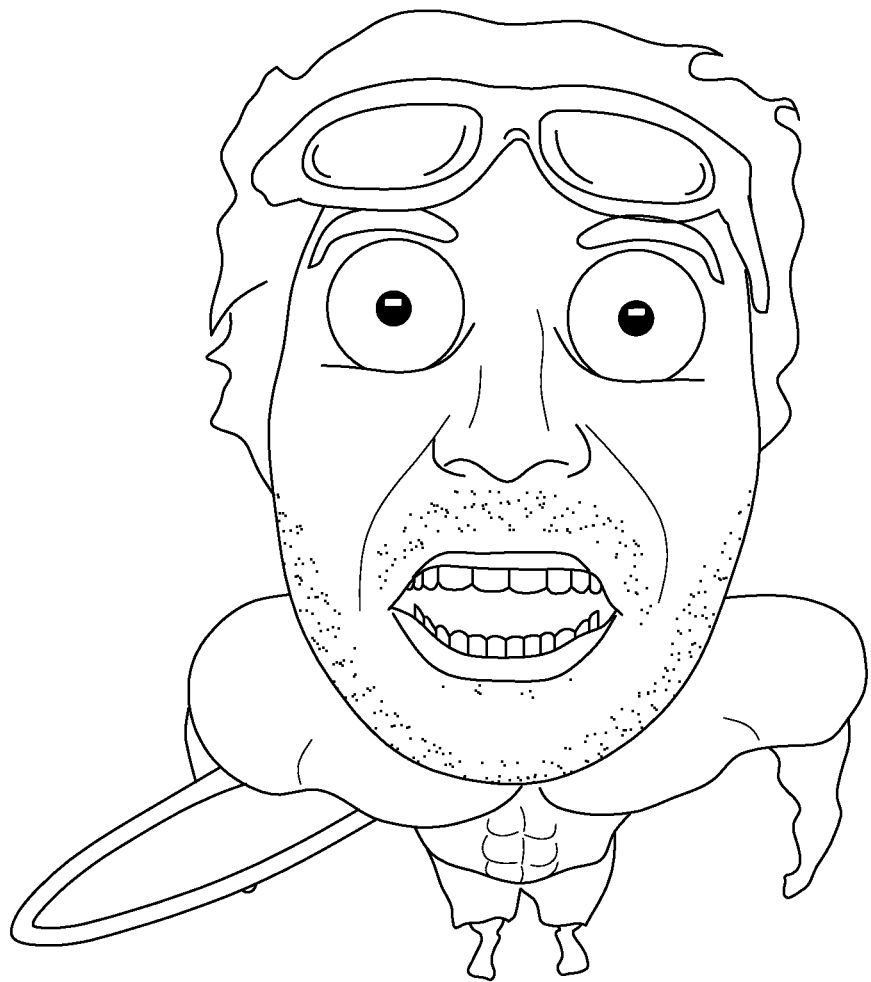
FIG. 3 is an illustration of an animated avatar.

FIG. 1 additionally shows that the method 100 can include attaching 108 the animated 3D model of a face to an animated character to render the resulting animation, one example embodiment of which is shown in FIG. 3. The animated character can include a "body" or other features that a head alone does not convey. For example, the animated character can include a dancing human, other human actions, animals or made up characters or any other desired animations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

II. Creation of a 3D Facial Model

Figure 4:
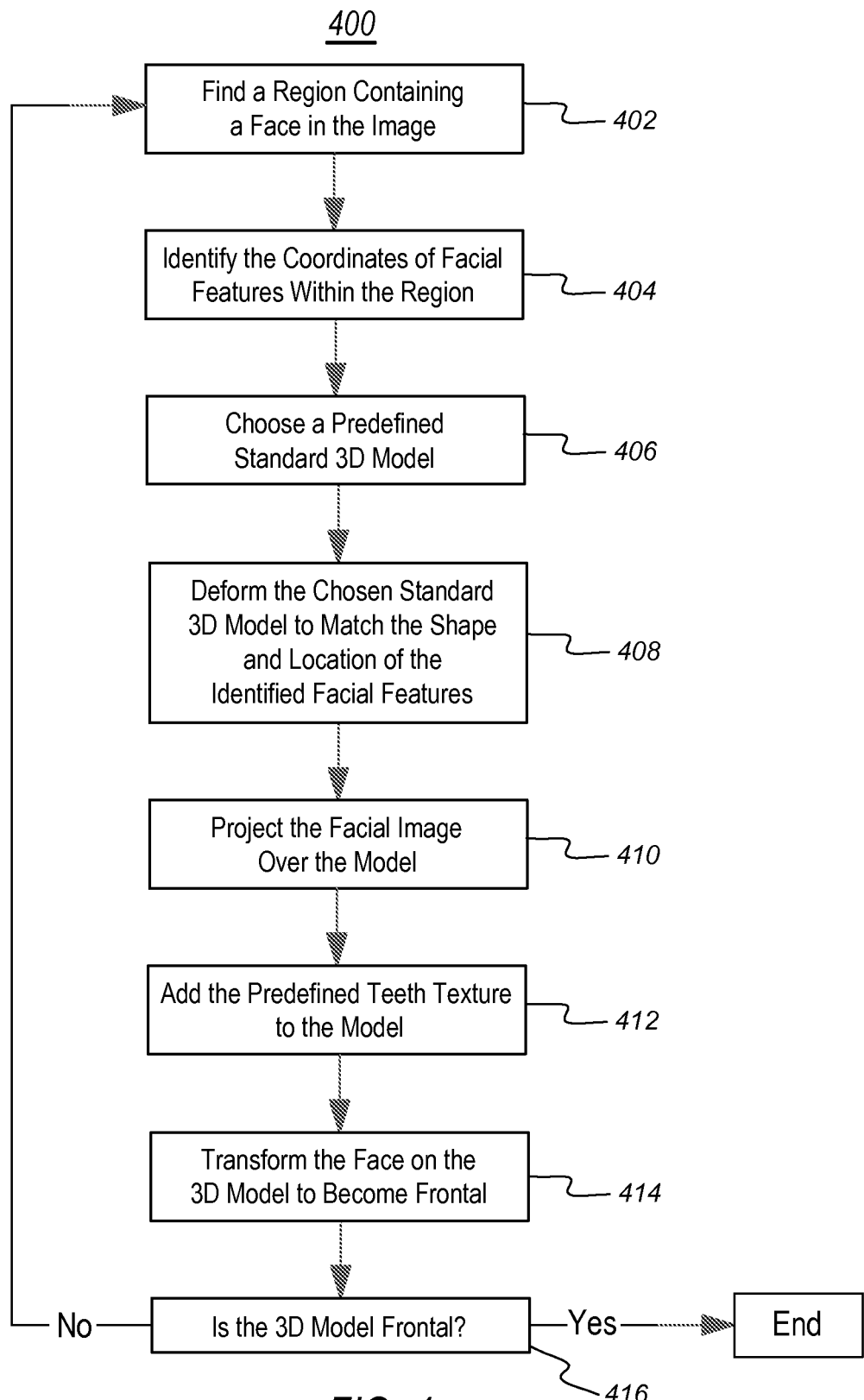
FIG. 4 is a flowchart illustrating an example of a method for creating a 3D model of a face.

FIG. 4 is a flowchart illustrating an example of a method 400 for creating a 3D model of a face. In at least one implementation, the 3D model can be created from a single 2D digital image of a face. I.e., a user can upload a desired image or image that will be converted into a 3D model.

FIG. 4 shows that the method 400 can include finding 402 a region containing a face in the image. To find a region containing the face any desired algorithm can be used. I.e., the algorithm can identify the face within the image, then select a region around the face. For example, a rectangle that encloses the face can be identified from the user supplied image. See, for example, Viola-Jones algorithm, P. Viola, M. Jones, *Robust real-time object detection*, Technical Report CRL 20001/01, Cambridge Research Laboratory, 2001 (which is incorporated by reference herein in its entirety).

Figure 5:
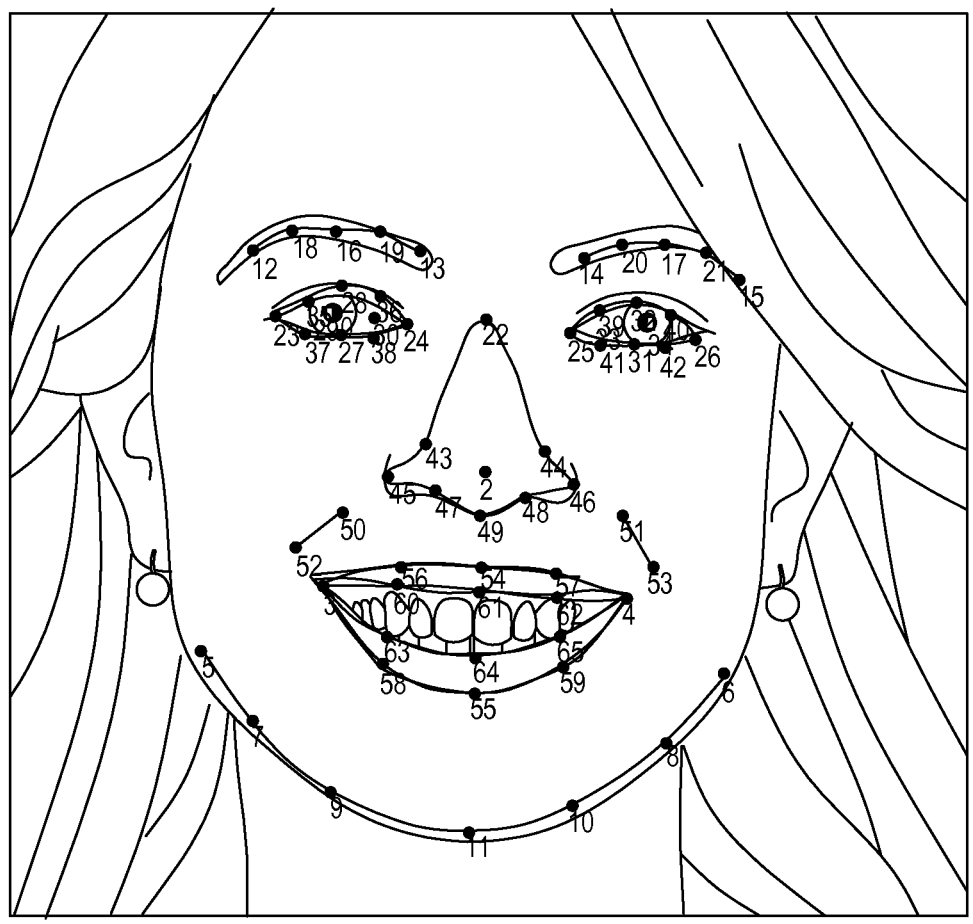
FIG. 5 is an illustration of identified facial features.

FIG. 4 also shows that the method 400 can include identifying 404 the coordinates of facial features (such as eyes, eyebrows, nose and mouth) within the region. To identify the coordinates of facial features, any known method for facial feature detection can be used. For example, the method described in the U.S. patent application Ser. No. 13/328,523 filed on Dec. 16, 2011, entitled "SYSTEM AND METHOD FOR AUTOMATIC DETECTION AND RECOGNITION OF FACIAL FEATURES", which application is incorporated herein by reference in its entirety, discloses one such method. For example, the incorporated method detects the coordinates of 66 facial features (such as pupils, eye corners, mouth corners, lips, nose, eyebrows, etc) one example embodiment of which is shown in FIG. 5. The number of detected facial features can be represented as N (e.g., 66 in the example above), and the coordinates of detected facial features as $f_k \in R^2$, $k=0, \ldots, N-1$.

FIG. 4 further shows that the method 400 can include choosing 406 a predefined "standard" 3D model. The 3D model can be chosen 406 based on facial expression, size, shape or any other desired criteria. The model represents a more or less average human face. Almost any 3D model of a face can be used as "standard". For example, a set of standard models for different facial expressions can be maintained and selected from. I.e., the facial expression of the source image is identified, and the corresponding standard model is chosen from the set. E.g., models for the following facial expressions can be used: neutral with closed mouth, neutral with open mouth, smiling with closed mouth, smiling with open mouth. One of skill in the art will appreciate that more facial expressions could be distinguished.

The following formula can be used to find if the mouth is open: the distance between the lower bound of upper lip and upper bound of lower lip is less than a certain threshold (for example, 1/10 of mouth width). The following formula can be used to find if the face is smiling: average Y coordinates of mouth corners are higher than average Y coordinates of lower bound of upper lip and upper bound of lower lip by a certain threshold (for example, 1/10 of mouth width).

The standard 3D model can consist of the following components: an ordered set of 3D points (vertices); a texture image; a corresponding set of texture coordinates for each vertex; and a set of polygons made of these vertices (usually triangles or quadrangles). The model can have a markup to define a correspondence between the detected facial features and 3D vertices. Concretely, each facial feature (of 66 used) has a corresponding vertex (the corresponding vertex is marked). For example, feature of pupil corresponds to a vertex centered in the iris of the 3D model; there will be N marked vertices in the model, and the rest are unmarked. Vertices of the 3D model can be denoted as $v_i \in R^3$, $i=1, \ldots, M$, and marked vertices as $v_{m_k}$, $m_k=1, \ldots, M$, $k=0, \ldots, N-1$.

The model of a face can be assumed to be in some sense orthogonal to the Z coordinate (i.e. most of the variation of the model is in the XY plane; for example, the line connecting pupils will lie approximately in the XY plane). The affine transformation of the detected facial features can be applied (and stored) to align left and right pupils (exemplarily designated as points $f_0$ and $f_1$) with two corresponding 3D vertices $v_{m_0}$, $v_{m_1}$, so that their (X,Y) coordinates are equal. After that the coordinates of each vertex $v_i$ can be deformed to align the (X,Y) coordinates of marked vertices $v_{m_k}$ with facial features $f_k$.

FIG. 4 additionally shows that the method 400 can include deforming 408 the chosen standard 3D model to match the location and shape of the identified facial features. To perform the deformation, any known algorithm for warping (or image warping) can be used, including algorithms based on radial basis functions, triangulation, or freeform deformation. While using these algorithms, each vertex can be deformed proportionally to the proximity of its Z coordinate to the Z coordinate of the marked vertices (i.e., vertices located remotely on the Z axis will not be deformed).

For example, the following method of deforming 408 the 3D model may be used. $\text{delta}_{m_k} \in R^3$ can be defined that specifies how marked vertices should be shifted to align with corresponding facial feature vertex. Specifically, $\text{delta}_{m_k} = f_k - v_{m_k}$. The following system of linear equations can then be solved for X:

$$A*X=B$$

Where A is a square matrix, $(a_{ij})=\Phi(|v_{m_i}-v_{m_j}|)$, where $|\cdot|$ denotes Euclidean distance, i, j $\in[0, \ldots, N-1]$; the columns of matrix B are individual right-hand sides, $b_i=\text{delta}_{m_i}$. $\Phi$ is a radial-basis function, $\Phi(x)=x$ (but $\Phi(x)$ may be equal to $\sqrt{x^2+c}$, or $1/\sqrt{x^2+c}$, or other radially symmetrical functions). Following the solution, each vertex $v_i$ is modified as follows, thus deforming the 3D model:

$$D(a) = \sum_{k=0,\ldots,N-1} X_k \cdot \Phi(|a - v_{m_k}|),$$

$$a \in R^3$$

$$v'_i = v_i + D(v_i),$$

where $X_k$ is k-th line of the matrix, D(a) is the deformation function of a vertex.

FIG. 4 moreover shows that the method 400 can include projecting 410 the facial image over the model to generate the texture. After the deformation, the source image (now texture image) of the face is projected onto the vertices (in the XY plane). The projection should account for the stored affine transformation. Thus each vertex obtains a texture coordinate (a coordinate in the texture image).

Figure 6:
FIG. 6 is an illustration of a teeth texture added to a 3D model.

FIG. 4 also shows that the method 400 can include adding 412 the predefined teeth texture to the model. If the mouth is closed and teeth are not visible then the teeth can be added, one example embodiment of which is shown in FIG. 6. Additionally or alternatively, the texture can replace the original teeth if they are visible. The predefined teeth texture can be based on the 3D model selected or based on some other method.

FIG. 4 further shows that the method 400 can include transforming 414 the face on the 3D model to become frontal. For example, it will be rotated 30 degrees left if the head on the source image was rotated 30 degrees right. If the source image was non-frontal the created 3D model will be non-frontal too. But the algorithms described below with regard to animating the face assume that face is frontal (to be able to rotate it a certain degree and attach it over a character's body rotated the same degree). Therefore, a method to "de-rotate" the face (make it frontal) is used.

First, the (X,Y) facial feature coordinates of more or less average frontal face are stored. Then the set of employed facial features is formed. Usually the set consists of features with numbers 2, 5-11, 23-28, 31, 32, 35-49, 54, 56, 57 and 60-65 in the example shown in FIG. 5. Then the 3D model may be mirrored around the horizontal axis (i.e. swap the left and right sides) if the face is going to be attached to a character where the head is rotated, and the user's face is rotated in the opposite direction. This is achieved by multiplying the vertices $v_i$ by the following matrix:

$$\begin{pmatrix} -1 & 0 & 0 \\ 0 & 1 & 0 \\ 0 & 0 & 1 \end{pmatrix}$$

The coordinates of facial features then have to be changed and facial features have to be renumbered. After that the 3×3 deformation matrix M can be calculated such that when we multiply the vertices $v_i$ by this matrix and render the 3D model, it will look frontal. In fact we need to find only the first two rows of the matrix M, as the 2D projection does not depend on the third row. These two rows can be found using the 2D coordinates $\text{Average}_i=(\text{AverageX}_i, \text{AverageY}_i)$ of facial features of the average face and the 3D coordinates $V_i=(X_i, Y_i, Z_i)$ of facial features of the model from the employed set (i=1, . . . , L). First both sets of points are translated in such a manner that the center of mass is located in the origin (further we assume that this holds for points $(\text{AverageX}_i, \text{AverageY}_i)$ and for points $(X_i, Y_i, Z_i)$). First a 2×3 matrix M' must be found such that the sum $$\Sigma_{i=1}^{L}(M'V_i - \text{Average}_i)^2$$

is minimal. This can be performed using the least squares method or any other desired method. Then the first column of the matrix M' can be normalized in such a way that its norm is more than 90% and less than 110% of the norm of the second column. For example, let $M_1$, $M_2$ and $M_3$ be the first, second and third columns of the matrix M' regarded as 2D vectors. To get the first two rows of the matrix M the elements of the matrix M' must be changed in such a way that the matrix M is "like" a part of a composition of rotation matrix and scale matrix. If $(M_1, M_2)*(M_1, M_3)*(M_3, M_2) \le 0$, then we do nothing. Otherwise the vector $M_3$ must be replaced by vector $M_3'$ in such way that $(M_1, M_3')*(M_3', M_2)=0$ and $|M_3'|=|M_3|$. There are no more than 4 vectors which satisfy these conditions. The vector closest to the vector $M_3$ has to be selected.

FIG. 4 additionally shows that the method 400 can include determining 416 whether the 3D model is frontal. I.e., although the rendering of the 3D model or the face on the 3D model now looks frontal, the model itself may not be frontal. For example, the line connecting the pupils was in the XY plane before this procedure, but now it may be somehow rotated out of this plane (since the model itself may have been rotated). Determining 416 whether the 3D model is frontal can include a detection algorithm or the 3D model can be assumed to be non-frontal until it has been rendered a predetermined number of times. If the 3D model is not frontal, the method then proceeds to finding 402 the face in the rendering of the 3D model and the method 400 is repeated until the face and the model are both frontal. If the 3D model is frontal, the method 400 is ended, allowing the 3D model to be used.

III. Control of Facial Expressions

To control facial expressions, a system of K expression definitions can be employed, where each expression definition defines certain facial state (for example, opened jaw or raised upper lip). To set an expression of a face, expression definitions are combined with certain amounts $P_j \in [0,1]$, j=1, . . . , K. If $P_j=0$, then j-th the expression definition is not applied; if $P_j=1$, then the j-th expression definition is fully applied. For example, there can be K=55 expression definitions, representing individual facial muscles and combinations of them. Each expression definition can store translation parameters, muscle parameters, intensity field, furrow parameters or any other desired parameters, which are described below.

Translation parameters can define the translation of each vertex by a certain value. For example, the translation direction of vertex $v_i$ for j-th expression definition may be denoted as $T_{ji} \in R^3$, i=1, . . . , M. Translation parameters may be absent in the muscle definition; in such a case $T_{ji}=0$.

Muscle parameters define the contraction of facial muscle. Facial muscle models an anatomically plausible muscle, attached to skin and facial bone, being able to contract and deform the 3D model of a face. The following are possible muscle parameters: attachmentSkeleton $\in [1, \ldots, M]$ is the index of vertex to which the muscle is attached, and which does not move on muscle contraction; attachmentSkin $\in [1, \ldots M]$ is the index of vertex to which the muscle is attached, and which moves on muscle contraction; attachmentVertexA $\in [1, \ldots, M]$ and attachmentVertexB $\in [1, \ldots, M]$ are the indices of vertices which define the cone (with attachmentSkeleton at the top of the cone, attachmentVertexA, attachmentVertexB on the sides) inside which the principal deformation of model occurs; effectiveAngle further refines the angle of the cone; and outerArea defines how far in the direction of the muscle the deformation occurs. Muscle parameters may be absent in expression definition; in such a case they are not necessarily applied. To calculate the displacement $d_{ji}$ of the vertex $v_i$ for the j-th expression definition modified equations from the paper Keith Waters, A muscle model for animation three-dimensional facial expression, ACM SIGGRAPH Computer Graphics Volume 21, Number 4, 1987 (incorporated herein in its entirety) can be used. The calculation of $d_{ji}$ depends on the current values of vertices $v_i$. The following can be denoted:

$$V_0 = v_{attachmentSkin},$$
$$V_1 = v_{attachmentSkeleton},$$
$$V_\alpha = v_{attachmentVertexA},$$
$$V_b = v_{attachmentVertexB},$$
$$\alpha = \angle(V_0 V_1 V_\alpha)$$
$$\beta = \angle(V_0 V_1 V_\beta)$$
$$V_2 = V_0 + (V_0 - V_1) \cdot outerArea$$
$$R_s = |V_1 - V_0|$$
$$R_f = |V_1 - V_2|$$
$$O_a = (V_\alpha - V_1) - \frac{1}{R_s} \cdot (V_0 - V_1) \cdot |V_\alpha - V_1| \cdot \cos\alpha$$
$$O_b = (V_\beta - V_1) - \frac{1}{R_s} \cdot (V_0 - V_1) \cdot |V_\beta - V_1| \cdot \cos\beta$$
$$O_p = (v_i - V_1) - \frac{1}{R_s} \cdot (V_0 - V_1) \cdot |v_i - V_1| \cdot \cos\alpha$$
$$AB = \angle(O_a, O_b)$$
$$AP = \angle(O_a, O_p)$$
$$BP = \angle(O_b, O_p)$$
$$ANG = \begin{cases} \alpha + \frac{AP}{AB}(\beta - \alpha), & AP < AB \\ \beta, & AB \leq AP \leq 2\pi - AB \\ \alpha - \frac{2\pi - AP}{AB}(\beta - \alpha), & AP > 2\pi - AB \end{cases}$$

The displacement $d_{ji}$ is calculated as follows:
$d_{ji}=A \cdot R$, where A is angular displacement factor, and R is radial displacement factor:

$$A = -\frac{1}{|a|} a \cdot e^{-\left(\frac{\angle(a,b)}{ANG}\right)^2} \cdot effectiveAngle$$

$$R = \begin{cases} \sin\left(\frac{|a|}{R_s} \cdot \frac{\pi}{2}\right), & |a| < R_s \\ \sin\left(\frac{R_f - |a|}{R_f - R_s} \cdot \frac{\pi}{2}\right), & |a| \geq R_s \end{cases}$$

$$a = v_i - V_1,$$
$$b = V_2 - V_1$$

Alternatively, A can be calculated as follows:

$$A = \cos\left(\frac{\angle(a, b)\pi}{ANG}\right)$$

Muscle parameters may be absent in the muscle definition; in such a case $d_j=0$.

Intensity field $S_{ji}$ defines how much vertex $v_i$ may be affected by translation or displacement. To create a facial expression in the face, each expression definitions can be applied as follows. First, translation parameters of each expression definition can applied to vertices:

$$v'_i = v_i + \sum_{j=1,\ldots,K} P_j \cdot T_{ji} \cdot S_{ji}$$
$$v_i \leftarrow v'_i$$

Second, muscle parameters of each expression definition can be applied sequentially for each k:
for j=1 to K
calculate $d_j$ for v $$v'_i = v_i + d_{ji} \cdot S_{ji}$$

$v_i \leftarrow v'_i$

Alternatively, muscle parameters in successive $N_{steps}$ steps can be applied to achieve better realism:
for s=0 to $N_{steps}-1$
for j=1 to K
calculate $d_j$ for v $$v'_i = v_i + d_{ji} \cdot S_{ji} / N_{steps}$$

$v_i \leftarrow v'_i$

To achieve further realism, furrows parameters can be employed. Furrow parameters specify how facial texture should be altered on the application of expression definition, and can include furrow image, furrow coordinates and a set of attachment points.

Facial texture image may be denoted as $I_{xy} \in R^3$ (a color image). The texture could be converted from RGB color model into a device-independent color model such LAB, CIE XYZ, HSV or HLS models. For example, the texture is converted into the LAB color model; the L, A, B channels of the image satisfy $I_{xy}^L \in [0,1]$, $I_{xy}^A \in [-0.5, 0.5]$, $I_{xy}^B \in [-0.5, 0.5]$.

$F_{xy}^j \in R^3$ can be defined as a furrow image of j-th muscle definition; the furrow image should be represented in the same color model as $I_{xy}$. Furrow coordinates specify the position of facial features on the furrow image. Before furrow image can be applied, it is deformed so that its furrow coordinates align with facial feature coordinates $f_k$. Alternatively, not every furrow coordinate could be aligned, but only the coordinates that are present in the set of attachment points. Any algorithm for image warping can be used for this, including the algorithm for radial-basis warping described earlier.

Furrow image defines how each pixel of the image should be altered. Usually, after the application of furrow image, furrows appear on facial image. Furrow images could be painted in a digital image editor, or created using the following method. First, an image of a human actor with neutral facial expression can be made (this image is denoted as $N_{xy}$). Second, the actor can take an expression that the corresponding expression definition is meant to show (for example, contracts a muscle that raises a corner of mouth), and an image of such expression is made (the $E_{xy}$ image). Third, the second image is deformed so its facial features align with coordinates of facial features on the first image (or vice versa), using any algorithm for image warping (including one described earlier). Fourth, assuming that first and second images are in the LAB color model, the L, A, B channels of furrow image are calculated as follows:

$$F_{xy}^L = \max(l_0, \min(l_1, E_{xy}^L - N_{xy}^L)) \cdot c_l$$

$$F_{xy}^A = \max(a_0, \min(a_1, E_{xy}^a / \max(\delta, N_{xy}^a))) \cdot c_a$$

$$F_{xy}^B = \max(b_0, \min(b_1, E_{xy}^b / \max(\delta, N_{xy}^b))) \cdot c_b$$

Where $\delta$ is a small value (for example, 1/255) to avoid division by zero; $l_i$, $a_i$, $b_i$ are boundaries for L, A, B channels (for example, −0.36, 0.36; 0.5, 1.5; 0.5, 1.5) to make the result softer; $c_l$, $c_a$, $c_b$ are the contrast constants (for example, 0.56, 0.54, 0.54) for the L, A, B channels.

After such calculation, furrow images $F^j$ are combined into the $G_{xy}$ image, taking into account the $P_j$ amounts of corresponding expression definitions. First, $G_{xy} \leftarrow 0 \ \forall x,y$. Second, for each expression definition, if $P_j \neq 0$, the following is calculated:

$$L_1 = G_{xy}^L$$

$$L_2 = P_j F_{xy}^{jL}$$

$$G_{xy}^L \leftarrow \begin{cases} L_2, & (L_1 \geq 0, L_2 \geq 0, L_2 > L_1) \text{ OR } (L_1 \leq 0, L_2 \leq 0, L_2 < L_1) \\ L_1 + L_2, & (L_1 \leq 0, L_2 \geq 0) \text{ OR } (L_1 \geq 0, L_2 \leq 0) \\ L_1, & \text{otherwise} \end{cases}$$

$$G_{xy}^A \leftarrow \begin{cases} P_j F_{xy}^{jA}, & (L_1 \geq 0, L_2 \geq 0, L_2 > L_1) \text{ OR } (L_1 \leq 0, L_2 \leq 0, L_2 < L_1) \\ G_{xy}^A \cdot (1 + c_1 \cdot P_j F_{xy}^{jA}) + P_j F_{xy}^{jA}, & (L_1 \leq 0, L_2 \geq 0) \text{ OR } (L_1 \geq 0, L_2 \leq 0) \\ G_{xy}^A, & \text{otherwise} \end{cases}$$

$$G_{xy}^B \leftarrow \begin{cases} P_j F_{xy}^{jB}, & (L_1 \geq 0, L_2 \geq 0, L_2 > L_1) \text{ OR } (L_1 \leq 0, L_2 \leq 0, L_2 < L_1) \\ G_{xy}^B \cdot (1 + c_2 \cdot P_j F_{xy}^{jB}) + P_j F_{xy}^{jB}, & (L_1 \leq 0, L_2 \geq 0) \text{ OR } (L_1 \geq 0, L_2 \leq 0) \\ G_{xy}^B, & \text{otherwise} \end{cases}$$

Where $c_1$, $c_2$ are constants (for example, 1/70).

The combined furrow image is applied to texture image as follows:

$$I'_{xy}{}^L \leftarrow I_{xy}{}^L + G_{xy}^L$$

$$I'_{xy}{}^A \leftarrow I_{xy}{}^A \cdot (G_{xy}^A / 2 + 0.5)$$

$$I'_{xy}{}^B \leftarrow I_{xy}{}^A \cdot (G_{xy}^B / 2 + 0.5)$$

Alternatively, we can apply the furrow images one by one, not calculating $G_{xy}$. The following procedure is then applied iteratively for every j:

$$I'_{xy}{}^L \leftarrow I_{xy}{}^L + P_j F_{xy}^{jL}$$

$$I'_{xy}{}^A \leftarrow I_{xy}{}^A \cdot (P_j F_{xy}^{jA}/2 + 1 - 0.5 P_j)$$

$$I'_{xy}{}^B \leftarrow I_{xy}{}^A \cdot (P_j F_{xy}^{jB}/2 + 1 - 0.5 P_j)$$

To achieve special effects, a furrow image can be constructed that, being applied to a face, makes it look older. In such a case, the above procedure for furrow creation should be run with a neutral image of a young person, and a neutral image of an older person. A number of furrow images for both genders and various ages and ethnicities can be created. To improve the plausibility an average of a set of images (with such an average calculated after each image from the set is deformed to align with mean facial feature coordinates of the set) can be used.

The application of translation parameters can be improved by the application of the following. Consider a translation that closes the eyelid, moving the vertices of the upper eyelid so they come close to the lower eyelid. For a given translation, it holds only for a certain model for which the translation was defined (in our case, the standard 3D model). If the translation is applied to another 3D model where the eyes are, for example, two times bigger, the distance traveled by the upper lid will be not sufficient for the eyelids to connect. Therefore the translation parameters $T_{ji}$ can be deformed to account for the geometry of the user's face. Using the method described above in relation to deforming 408 the chosen "standard" 3D model to match the location and shape of facial features of FIG. 4 the deformation function D(a) can be calculated. Let us denote the vertices of the standard model as $s_i$. The translation parameters $T_{ji}$ can be modified in the following manner:

$$s'_i = s_i + T_{ji}$$

$$s''_i = D(s'_i)$$

$$T_{ji} \leftarrow s''_i - v_i$$

The following facial muscles known from anatomy can be modeled (via the corresponding muscle parameters or translation parameters), usually modeling left and right muscles (such as Zygomatic Major left & right) separately: Frontalis, Eyelid R, Superior Rectus, Inferior Rectus, Lateral Rectus, Medial Rectus, Orbicularis oculi, Levator labii superioris alaeque nasi, Levator labii superioris, Zygomatic major, Zygomatic minor, Levator anguli oris, Risorius, Orbicularis oris, Depressor anguli oris, Depressor labii inferioris, Mentalis, Platysma, Lateral pterygoid, Medial Pterygoid, Corrugator supercili, Levator palpebrae superioris, Depressor supercili, Procerus. To model a muscle, one needs to define the corresponding expression definition, to make the model behave like the anatomical muscle.

IV. Adjusting the Appearance of a 3D Facial Model

Figure 7:
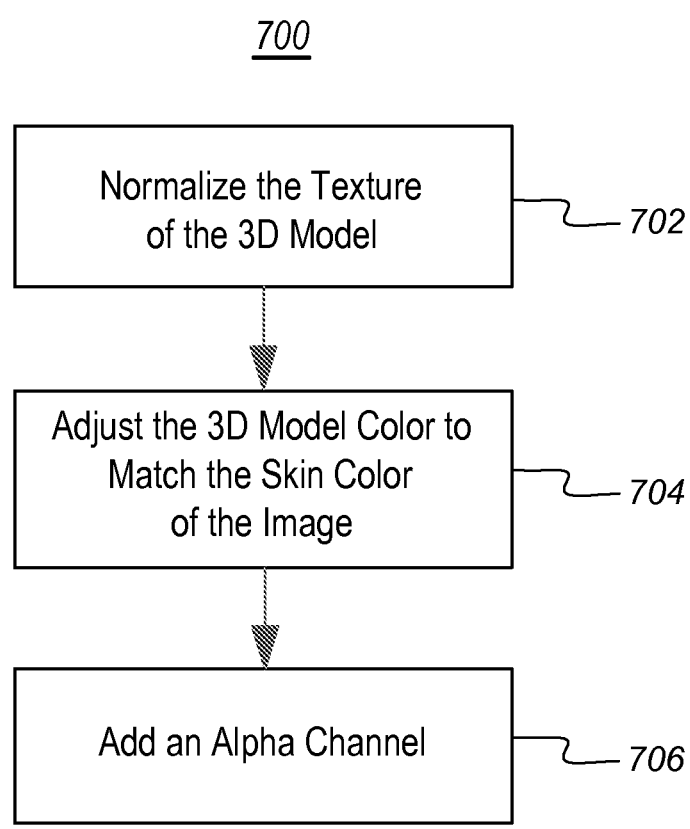
FIG. 7 is a flowchart illustrating an example of a method for adjusting the appearance of a 3D facial model.

FIG. 7 is a flowchart illustrating an example of a method 700 for adjusting the appearance of a 3D facial model. I.e., following the creation of the 3D model, it and/or the character to which it will be attached can be adjusted to better match one another. This allows for a better final appearance of the modified face and also for more precise blending with the animated character.

FIG. 7 shows that the method 700 can include normalizing 702 the texture of the 3D model. For example, the texture of the 3D model can be normalized 702 to compensate for the lighting effects in case the face is lit unevenly (for example, the left half is lighter/darker than the right). To perform this, a bilinear function is fit to the certain channel c of the texture $I_{x,y}^c$ using a linear regression method. The function can be fit to a small window inside the $I_{x,y}^c$ to account only for the internal part of the face. After that, the found function may subtracted from the texture $I_{x,y}^c$, further adding the mean of the found function to each pixel. This procedure may be applied to the lighting channel only (L), or to each color channel (L, A and B). Alternatively, a more complex function (for example, polynomial) can be fit using least squares method.

FIG. 7 also shows that the method 700 can include adjusting 704 the 3D model color to match the skin color of the character's image. The color of the character's skin is known, and can be denoted as $(S^L, S^A, S^B)$ in the LAB color space. The color of the 3D model's skin can be estimated. First a histogram $H_i$ of each channel of the $I_{x,y}$ values within the window that includes the internal part of face can be collected. It can be assumed that $I_{x,y} \in [0, \ldots, 255]$ (if not, it can be normalized). Then the MeanShift procedure for L, A and B channels is initiated separately. MeanShift procedure starts at each histogram index from 0 to 255 (i.e. startingPoint=0 to 255) and, for each startingPoint, applies iteratively the following equation until convergence:

$$startingPoint \leftarrow \frac{\sum_{i \in \Omega} H_i \cdot i \cdot e^{-(i-startingPoint)^2/\sigma}}{\sum_{i \in \Omega} H_i \cdot e^{-(i-startingPoint)^2/\sigma}},$$

where $\sigma$ is the bandwidth (for example, 40), $H_i$ is the histogram of the corresponding color channel, $\Omega$ is a neighborhood of the startingPoint (for example, [startingPoint−64; startingPoint+64]. The result of the MeanShift procedure is the converged startingPoint value that has the largest confidence value:

$$confidence = \sum_{i \in \Omega} H_i \cdot e^{-(i-startingPoint)^2/\sigma}.$$

Thus, the application of the procedure to the histogram of each color channel finds the skin color of the texture, denoted as $(M^L, M^A, M^B)$. Following the calculation, we modify the texture image as follows: $I_{xy}^c \leftarrow I_{xy}^c - (M^c - S^c) \cdot K_{face}$, $c \in L, A,$ B, where $K_{face}$ is a constant specifying the strength of color modification (e.g., 0.5). After that, the correction parameters $(C^L, C^A, C^B)$ are calculated as $C^L = (M^L - S^L) \cdot (1 - K_{face})$, $C^A = (M^A - S^A) \cdot (1 - K_{face})$, $C^B = (M^B - S^B) \cdot (1 - K_{face})$.

FIG. 7 further shows that the method 700 can include adding 706 an alpha channel. The 3D model, when rendered, has non-smooth edges (see, for example FIG. 6). When attaching the 3D model to a character, it is essential for the model to have smooth edges to seamlessly integrate with the character's head. To facilitate this, an alpha channel is added to the 3D model's texture.

Figure 8:
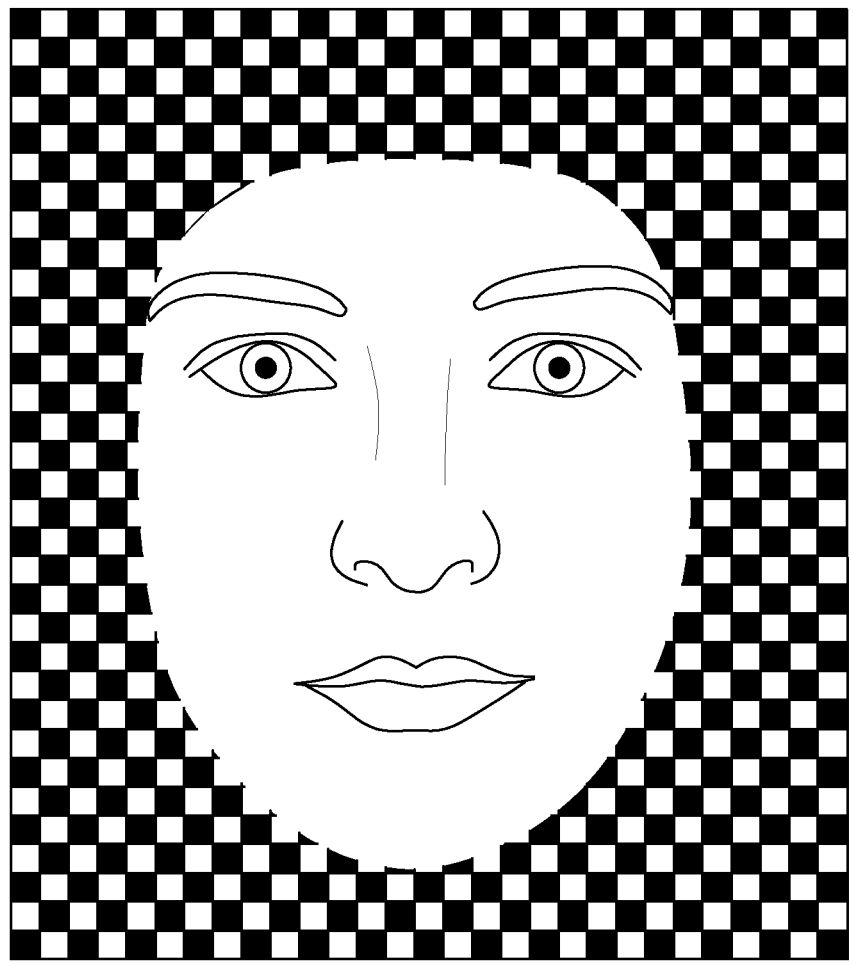
FIG. 8 is an illustration of an alpha template.

An alpha channel defines which parts of face are visible, which are not, and which are semi-transparent. An alpha channel is defined via an alpha template. The alpha template is a facial image with alpha channel (usually a PNG image), and the coordinates of its facial features. The alpha channel of that image is then transferred to the texture image of the 3D model. To perform this, the alpha template is deformed to have same facial feature coordinates as the texture image (using any procedure for image warping, for example the one described above), and the values of the alpha channel of the alpha template is assigned to the alpha channel of the texture image, $I_{x,y}^a$. A sample alpha template image is shown in FIG. 8 (the checkerboard is visible in the transparent parts of image). One can use various alpha templates (for example, with different parts of face visible) to achieve different artistic effects.

V. Attachment of a 3D Facial Model to a Character

Figure 9:
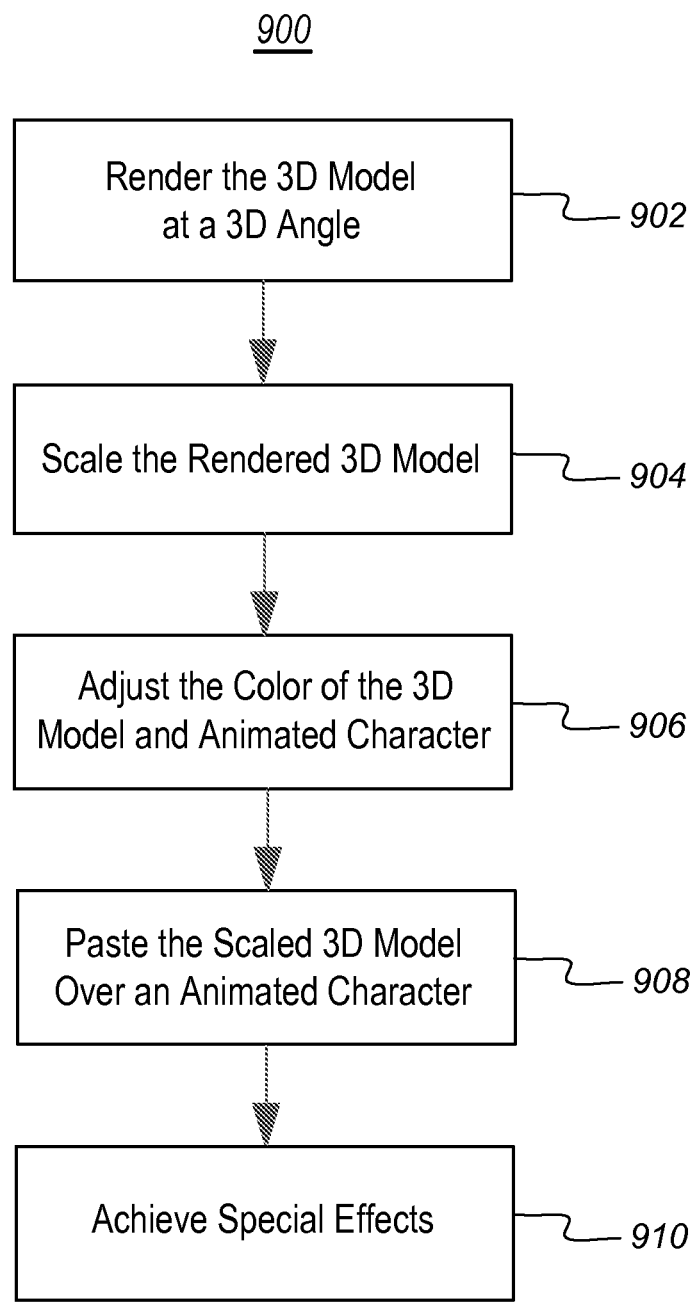
FIG. 9 is a flow chart illustrating a method of attaching a 3D facial model to a character.

FIG. 9 is a flow chart illustrating a method 900 of attaching a 3D facial model to a character. The character can be any desired character. For example, the character can be a caricature of a human body, a cartoon character, an animal or any other desired character.

FIG. 9 shows that the method 900 can include rendering 902 the 3D model at a 3D angle. The 3D model consists of polygons, which are rendered one by one by using known algorithms for 3D rendering, or standard libraries like OpenGL or Microsoft DirectX. The 3D model is rendered into an image (called "rendering result") at a certain angle.

FIG. 9 also shows that the method 900 can include scaling 904 the rendered 3D model. That is, the size of the rendered 3D model can be adjusted to match the size of the character to which it will be attached. This may include either increasing the size, decreasing the size, or leaving the size unchanged depending on the original size of the rendered image.

FIG. 9 additionally shows that the method 900 can include adjusting 906 the color of the 3D model and the animated character. The color of the top and bottom layers can be adjusted 906 by applying correction parameters $(C^L, C^A, C^B)$ as follows. The color of the character's skin is known and is denoted as $(S^L, S^A, S^B)$, as described earlier. For each pixel p we estimate the probability s that pixel belongs to skin using a simple Gaussian model:

$$s = e^{-0.5 \frac{(p^A - S^A)^2}{(c_1 \sigma)^2} + \frac{(p^B - S^B)^2}{(c_2 \sigma)^2}},$$

where $\sigma$ is standard deviation (for example, 4.42), and $c_1, c_2$ are constants (for example, 2.55 and 2.046). The model can be extended to include the L channel as well, or use other models (for example, Gaussian mixture model). After that, the pixel p is corrected proportionally to the calculated s value: $p^c \leftarrow p^c + C^c s$, $c \in \{L, A, B\}$.

FIG. 9 further shows that the method 900 can include pasting 908 the scaled 3D model over an animated character.

That is the scaled 3D will become a top layer which will be pasted 908 over a bottom layer, which depicts the desired character. The pasting 908 occurs at a given coordinate, accounting for the rendering result's alpha channel (which originates from image texture) via the procedure known as alpha blending. The top layer may contain various accessories (like eyeglasses, hair, hat and so on). Alpha blending is defined as follows:

$$d'^c = \begin{cases} (s^c + d^c \cdot t \cdot (1-t_2))/t_3, & t_3 > 0 \\ s^c \cdot t_2 + d^c \cdot (1-t_2), & \text{otherwise} \end{cases},$$

$$c \in \{L, A, B\}$$

$$d'^a = t_3$$

where s is the pixel of the pasted image, d is the pixel of the underlying image, d' is the resulting pixel, c is the channel, $c \in \{L,A,B,a\}$, a means alpha channel; $t=d^a, t_2=s^a, t_3=t_2+t(1-t_2)$. When pasting the rendering result over the bottom layer at given coordinates, it can be translated with subpixel accuracy in case of float coordinates (to achieve better realism).

Alternatively, an approach can be used where the rendered 3D model is combined with bottom and top layers at the moment of rendering, utilizing the standard libraries like OpenGL or Microsoft DirectX. Moreover, additional 3D models can be rendered along with the 3D model of a face (like models of body or accessories). Also the 3D model can be attached to a neck of a 3D body, thus making a solid 3D body, which is animated and rendered as a whole.

FIG. 9 moreover shows that the method 900 can include achieving 910 special effects. For example, a facial layer can be employed. This layer depicts elements that should be displayed over certain facial features (like tears over eyes, freckles on cheeks, etc). Assuming that the coordinates of facial features (even if they are not visible) in the facial layer are known, this layer is deformed so that its facial features align with facial features of image texture, and is pasted over the image texture (with alpha blending) before the rendering of the 3D model. Alternatively, it can be aligned with and pasted over the rendering result after the rendering.

VI. Animation of the Model

Figure 10:
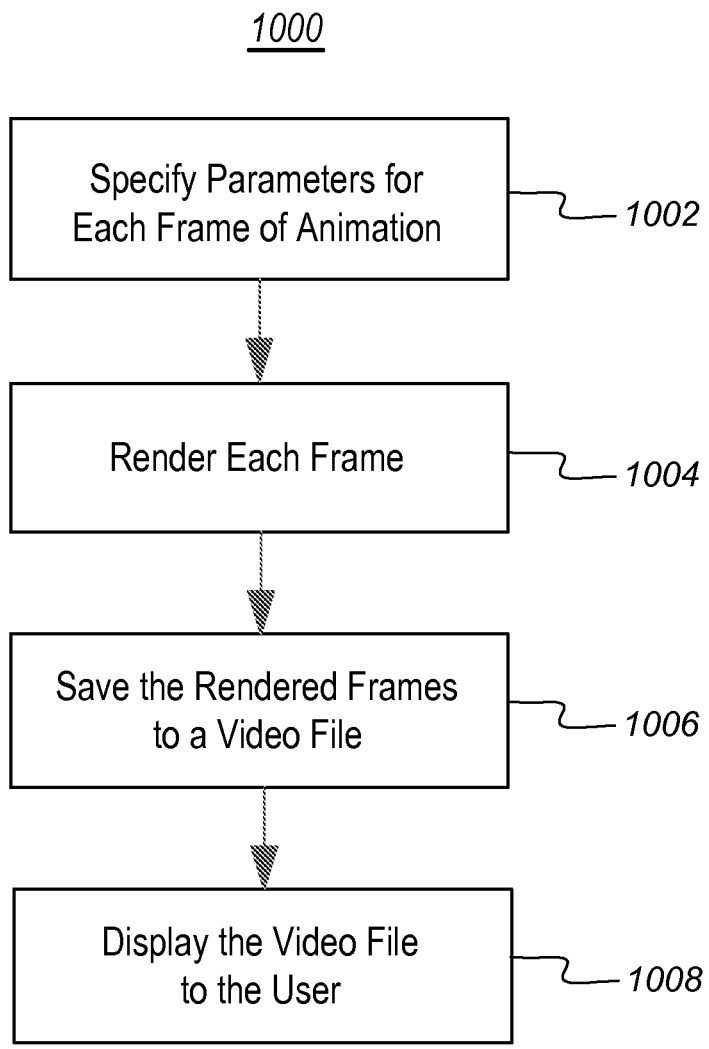
FIG. 10 is a flowchart illustrating a method of animating a 3D model.

FIG. 10 is a flowchart illustrating a method 1000 of animating a 3D model. Animating the 3D model can include having the 3D model move, show facial expressions or perform any other desired action. For example, the method 1000 can include the 3D model dancing or performing some other desired action. One of skill in the art will appreciate that "animating" can include creating a single image or multiple images which provide the appearance of movement.

FIG. 10 shows that the method 1000 can include specifying 1002 parameters for each frame of animation. For example, the parameters can include amounts $P_j$ of each expression definition, the angle, scale and position of the 3D model, the image of bottom layer, and the image of top layer (and the image of facial layer if needed). The parameters can determine the appearance of each still or frame within the animation.

FIG. 10 also shows that the method 1000 can include rendering 1004 each frame. I.e., the parameters are specified 1002 for each frame of the animation. As the parameters change, the animation progresses. That is, the specified 1002 parameters, defined for each frame, form a sequence of parameters, or a template. The template also may include the character's skin color, the employed alpha template.

The template is usually created by a person skilled in drawing and animation. The person usually draws the bottom and top layers, and defines keyframes at certain time moments that specify $P_j$, angle, scale and position of the 3D model. The mentioned parameters outside keyframes are calculated by interpolation (for example, linear or spline interpolation). Suitable software for defining keyframes and bottom/top layers can be used, for example Adobe After Effects or Adobe Flash; in such a case a special plugin may be created that renders the 3D model given parameters received from Adobe After Effects. The template could also include a preview animation created by applying the template to a predefined face (or a preview still image containing a still image of that character). Such preview may be displayed to the user to show what the resulting animation could look like.

FIG. 10 further shows that the method 1000 can include saving 1006 the rendered frames to a video file. For example, the video file can include .AVI, .MPG, .3GP, animated GIF or any other desired format. The format can be predetermined or can be selected by the user. Additionally or alternatively, the format can be determined by the intended use.

FIG. 10 additionally shows that the method 1000 can include displaying 1008 the video file to the user. For example, the video can be automatically displayed 1008 after saving 1006 and request the user to approve the final product. Additionally or alternatively, the video location can be provided to the user who can then display 1008 the video file when desired.

VII. Server-Side Infrastructure

One or more implementations may employ a server-side infrastructure that allows web sites and web applications to send a facial image and receive the animation in return. The infrastructure can employ several servers which share the tasks of rendering. The servers could be dedicated or located in the cloud (like Amazon S3 Cloud service).

Figure 11:
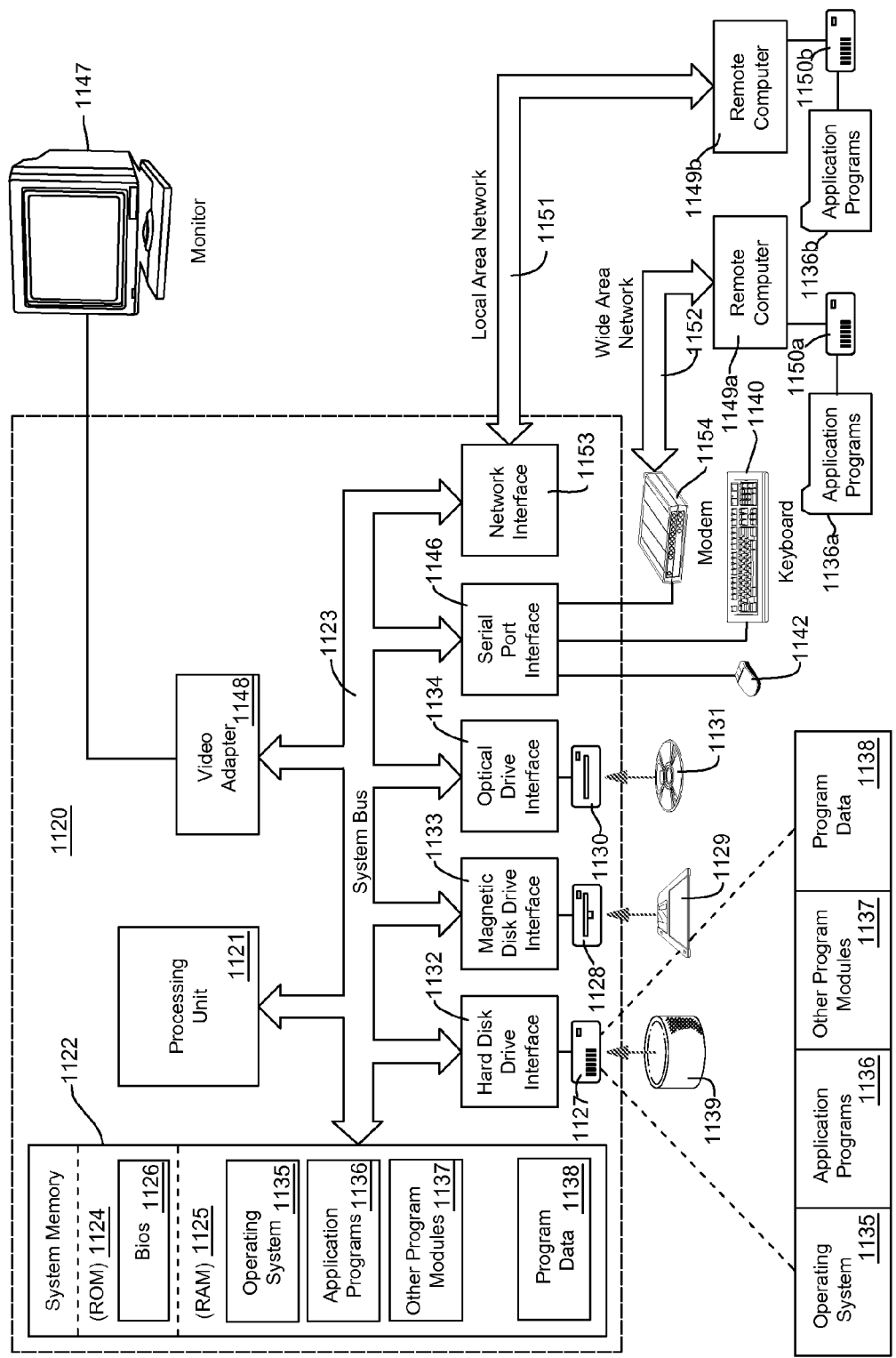
FIG. 11 illustrates an example of a suitable computing environment in which the invention may be implemented.

FIG. 11, and the following discussion, is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One of skill in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 11, an example system for implementing the invention includes a general purpose computing device in the form of a conventional computer 1120, including a processing unit 1121, a system memory 1122, and a system bus 1123 that couples various system components including the system memory 1122 to the processing unit 1121. It should be noted however, that as mobile phones become more sophisticated, mobile phones are beginning to incorporate many of the components illustrated for conventional computer 1120. Accordingly, with relatively minor adjustments, mostly with respect to input/output devices, the description of conventional computer 1120 applies equally to mobile phones. The system bus 1123 may be any of several types of bus structures including a memory bus or memory controller, a peripheral bus, and a local bus using any of a variety of bus architectures. The system memory includes read only memory (ROM) 1124 and random access memory (RAM) 1125. A basic input/output system (BIOS) 1126, containing the basic routines that help transfer information between elements within the computer 1120, such as during start-up, may be stored in ROM 1124.

The computer 1120 may also include a magnetic hard disk drive 1127 for reading from and writing to a magnetic hard disk 1139, a magnetic disk drive 1128 for reading from or writing to a removable magnetic disk 1129, and an optical disc drive 1130 for reading from or writing to removable optical disc 1131 such as a CD-ROM or other optical media. The magnetic hard disk drive 1127, magnetic disk drive 1128, and optical disc drive 1130 are connected to the system bus 1123 by a hard disk drive interface 1132, a magnetic disk drive-interface 1133, and an optical drive interface 1134, respectively. The drives and their associated computer-readable media provide nonvolatile storage of computer-executable instructions, data structures, program modules and other data for the computer 1120. Although the exemplary environment described herein employs a magnetic hard disk 1139, a removable magnetic disk 1129 and a removable optical disc 1131, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 1139, magnetic disk 1129, optical disc 1131, ROM 1124 or RAM 1125, including an operating system 1135, one or more application programs 1136, other program modules 1137, and program data 1138. A user may enter commands and information into the computer 1120 through keyboard 1140, pointing device 1142, or other input devices (not shown), such as a microphone, joy stick, game pad, satellite dish, scanner, motion detectors or the like. These and other input devices are often connected to the processing unit 1121 through a serial port interface 1146 coupled to system bus 1123. Alternatively, the input devices may be connected by other interfaces, such as a parallel port, a game port or a universal serial bus (USB). A monitor 1147 or another display device is also connected to system bus 1123 via an interface, such as video adapter 1148. In addition to the monitor, personal computers typically include other peripheral output devices (not shown), such as speakers and printers.

The computer 1120 may operate in a networked environment using logical connections to one or more remote computers, such as remote computers 1149*a* and 1149*b*. Remote computers 1149*a* and 1149*b* may each be another personal computer, a server, a router, a network PC, a peer device or other common network node, and typically include many or all of the elements described above relative to the computer 1120, although only memory storage devices 1150*a* and 1150*b* and their associated application programs 1136*a* and 1136*b* have been illustrated in FIG. 11. The logical connections depicted in FIG. 11 include a local area network (LAN) 1151 and a wide area network (WAN) 1152 that are presented here by way of example and not limitation. Such networking environments are commonplace in office-wide or enterprise-wide computer networks, intranets and the Internet.

When used in a LAN networking environment, the computer 1120 can be connected to the local network 1151 through a network interface or adapter 1153. When used in a WAN networking environment, the computer 1120 may include a modem 1154, a wireless link, or other means for establishing communications over the wide area network 1152, such as the Internet. The modem 1154, which may be internal or external, is connected to the system bus 1123 via the serial port interface 1146. In a networked environment, program modules depicted relative to the computer 1120, or portions thereof, may be stored in the remote memory storage device. It will be appreciated that the network connections shown are exemplary and other means of establishing communications over wide area network 1152 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for creating an avatar from an image, the method comprising:
   receiving an image including a face from a user;
   constructing a 3D model of the face from the image, wherein constructing a 3D model of the face includes:
   adding an alpha channel using an alpha template, wherein the alpha template is deformed so that its facial feature coordinates match those of the face from the user;
   adding a predefined teeth texture to the 3D model; and
   adjusting the color of the 3D model to match the skin color of the animated character;
   animating the 3D model, wherein animating the 3D model includes:
   an expression definition, wherein the expression definition:
   defines a certain facial state; and
   includes:
   muscle parameters, wherein the muscle parameters:
   model the contraction an anatomically plausible facial muscle; and
   are applied in successive iterations; and
   attaching the 3D model to an animated character.

2. The method of claim 1, wherein constructing a 3D model of the face includes:
   finding a region contain the face in the image using a cascade classifier.

3. The method of claim 1, wherein constructing a 3D model of the face includes:
   identifying the coordinates of one or more facial features within the face using at least one of:
   an active shape model;
   a genetic algorithm method; or
   a mean shift method.

4. The method of claim 1, wherein constructing a 3D model of the face includes:
   identifying a facial expression within the face;
   choosing a predefined 3D model with a facial expression that matches the identified facial expression; and deforming the predefined 3D model to match the shape and location of the identified coordinates of the one or more facial features.

5. The method of claim 4, wherein constructing a 3D model of the face includes:
projecting the facial image over a predefined 3D model.

6. The method of claim 1, wherein constructing a 3D model of the face includes:
transforming the 3D model to become frontal, wherein transforming the 3D model to become frontal includes:
storing the facial feature coordinates of an average frontal face;
calculating a deformation matrix from the facial feature coordinates of the average frontal face and from the 3D coordinates of the 3D model.

7. The method of claim 1, wherein constructing a 3D model of the face includes:
correcting uneven lighting of the 3D model.

8. A method for creating an avatar from an image, the method comprising:
receiving an image including a face from a user;
identifying the coordinates of one or more facial features within the face;
constructing a 3D model of the face from the image including:
choosing a predefined 3D model;
adding an alpha channel using an alpha template, wherein the alpha template is deformed so that its facial feature coordinates match those of the face from the user;
deforming the predefined 3D model to match the shape and location of the identified coordinates of the one or more facial features;
projecting the facial image over a predefined 3D model;
correcting uneven lighting of the 3D model;
adding a predefined teeth texture to the 3D model; and
adjusting the color of the 3D model to match the skin color of the animated character;
animating the 3D model, wherein animating the 3D model includes:
an expression definition, wherein the expression definition:
defines a certain facial state: and
includes:
muscle parameters, wherein the muscle parameters:
model the contraction an anatomically plausible facial muscle; and
are applied in successive iterations; and
translation parameters; and
furrow parameters, wherein the furrow parameters:
alter the texture of the 3D model;
deform a furrow image so that its facial feature coordinates match those of the face from the user; and
leave the coordinates of the vertices of the 3D model unchanged; and
attaching the 3D model to an animated character.

9. The method of claim 8, wherein animating the 3D model includes:
rendering the 3D model at a predefined 3D angle as a 2D image.

10. The method of claim 8, wherein animating the 3D model includes:
scaling the rendered 3D model to match the size of the animated character; and
pasting the scaled 2D image over the character's 2D image.

11. In a computing system, a non-transitory computer-readable storage medium including instructions that, when executed by a computing device, cause the computing device to create an avatar from an image by performing the steps:
receiving an image including a face from a user;
identifying the coordinates of one or more facial features within the face;
constructing a 3D model of the face from the image including:
choosing a predefined 3D model;
adding an alpha channel using an alpha template, wherein the alpha template is deformed so that its facial feature coordinates match those of the face from the user;
deforming the predefined 3D model to match the shape and location of the identified coordinates of the one or more facial features;
transforming the 3D model to become frontal, wherein transforming the 3D model to become frontal includes:
storing the facial feature coordinates of an average frontal face;
calculating a deformation matrix from the facial feature coordinates of the average frontal face and from the 3D coordinates of the 3D model;
projecting the facial image over a predefined 3D model;
adding a predefined teeth texture to the 3D model; and
adjusting the color of the 3D model to match the skin color of the animated character;
rendering the 3D model at a predefined 3D angle;
animating the 3D model, wherein animating the 3D model includes:
an expression definition, wherein the expression definition:
defines a certain facial state: and
includes:
translation parameters;
muscle parameters, wherein the muscle parameters:
model the contraction an anatomically plausible facial muscle; and
are applied in successive iterations;
include:
a vertex to which a muscle is attached; and
a vertex which moves on muscle contraction; and
furrow parameters, wherein the furrow parameters:
alter the texture of the 3D model;
deform a furrow image so that its facial feature coordinates match those of the face from the user; and
leave the coordinates of the vertices of the 3D model unchanged; and
attaching the 3D model to an animated character.

12. The method of claim 11, wherein animating the 3D model includes:
achieving special effects.

13. The method of claim 12, wherein achieving special effects includes:
simulating a facial layer, wherein simulating a facial layer includes depicting elements over certain facial features; and
deforming the facial layer to align the facial features of the facial layer with the facial features of the face.

14. The method of claim 11, wherein animating the 3D model includes:

specifying parameters for each frame, wherein the parameters include:
specifying the parameters of each expression definition to show various expressions;
the image of a bottom layer; and
the image of a top layer.

15. The method of claim 11, wherein animating the 3D model includes:
rendering each frame according to a template.

16. The method of claim 11, wherein animating the 3D model includes:
saving the rendered frames to a video file.

17. The method of claim 11, wherein animating the 3D model includes:
displaying the video file to the user.

* * * * *